July 2, 1957  H. P. HART  2,797,829
BRAKE CONTROLLED LOG CART
Filed July 22, 1955  2 Sheets-Sheet 2

HAROLD P. HART
INVENTOR

BY James L. Girman
ATTORNEY

United States Patent Office 2,797,829
Patented July 2, 1957

2,797,829

BRAKE CONTROLLED LOG CART

Harold P. Hart, Coquille, Oreg.

Application July 22, 1955, Serial No. 523,829

1 Claim. (Cl. 214—85.1)

This invention relates to improvements in log carts especially designed for use in the logging industry for hauling logs from the cutting areas to a mill or other destination instead of by the ground skidding methods used heretofore.

It is one of the principal objects of the invention to provide a cart of this character which is of simple, efficient and durable construction built for stability and balance, capable of hauling a maximum load in and out of tight places in standing timber or through selective cutting areas.

An equally important object is to provide the cart with hydraulic brakes remotely manually controlled by the operator of the tractor or other vehicle towing the cart. This braking system constitutes an important feature of the invention since it enables the cart to become anchored anywhere regardless of the presence or absence of a fallen log which heretofore had to be relied upon to block movement of the cart and its tractor toward a load being pulled toward the cart.

A further object of the invention resides in the construction of the main frame of the cart and its attachment to the supporting wheels in such a manner that maximum load clearance will be provided.

The foregoing and other objects will appear as my invention is more fully hereinafter described in the following specification, illustrated in the accompanying drawings, and finally pointed out in the appended claims.

In the accompanying drawings:

Figure 4 is a detail view of an hydraulic brake.

Figure 1:
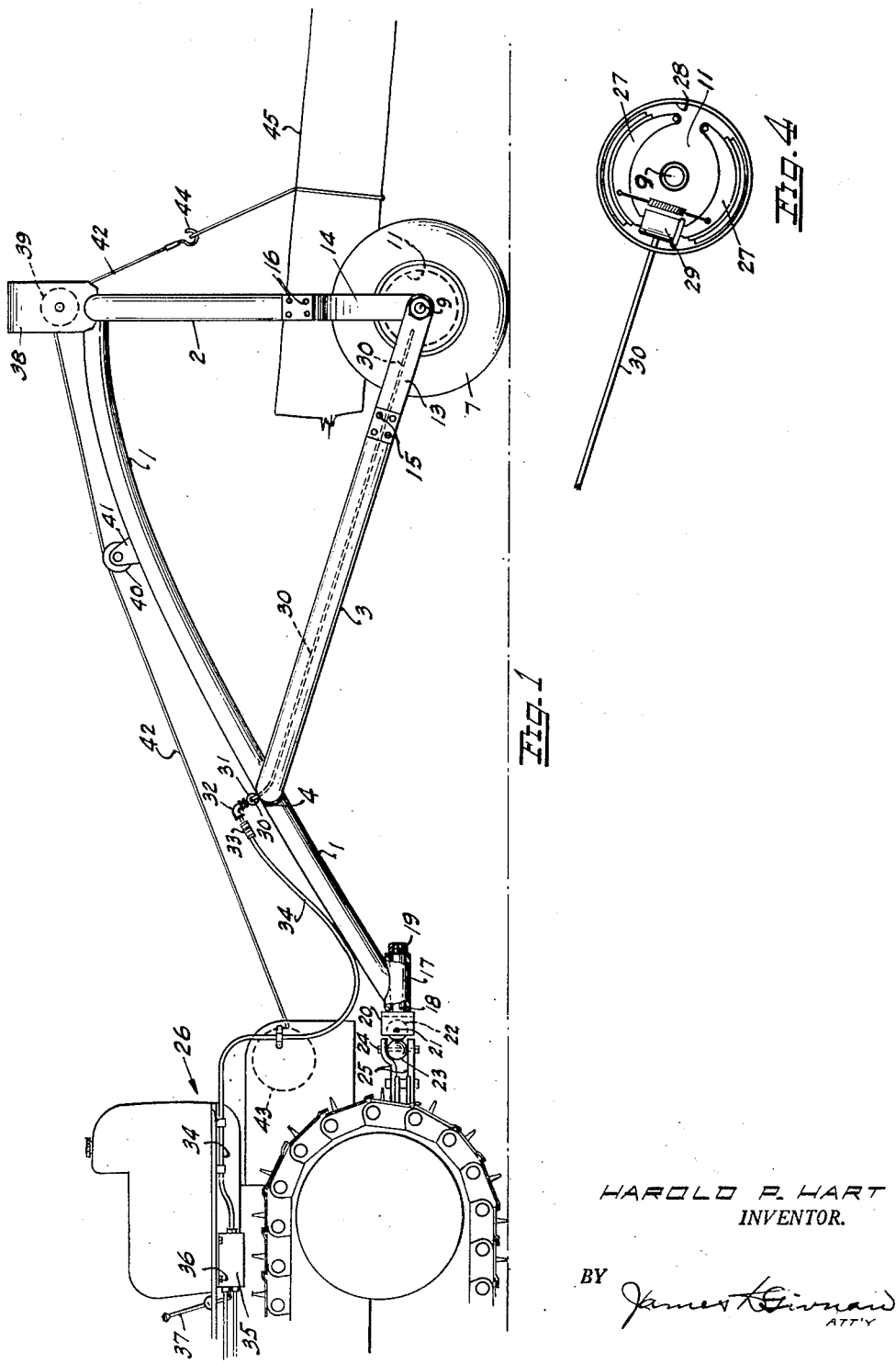
Figure 1 is a side view of a log cart made in accordance with my invention and shown coupled to a tractor by means of a hitch also incorporated within the invention.
Figure 2:
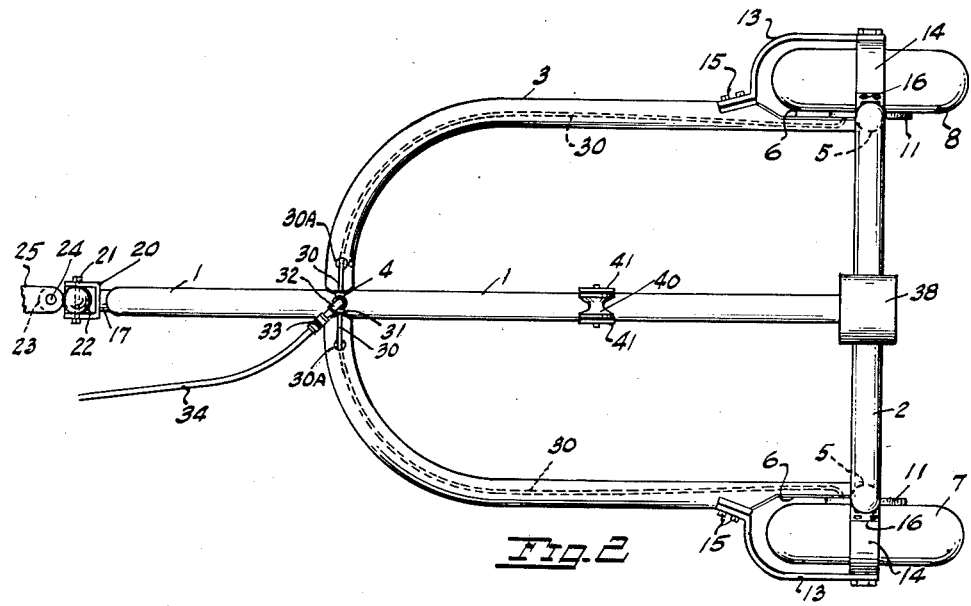
Figures 2 and 3 are top plan and end views, respectively, of Figure 1 with the tractor, the load, and load dragging and lifting cable removed.
Figure 3:
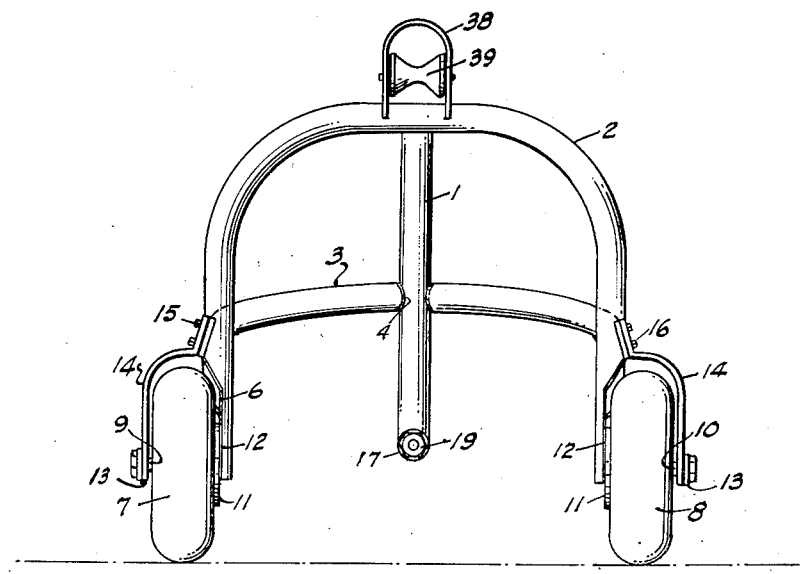

Referring now more particularly to the drawings:

The chassis of the cart comprises an upwardly and rearwardly curved boom indicated by reference numeral 1, secured by welding or the like at its trailing end to the top end of an inverted U-shaped frame member indicated at 2. The boom 1 and frame 2 are rigidly stabilized by a U-shaped strut frame 3 welded at its forward end as at 4 to the boom 1 and having the ends of its legs welded as at 5 to the bottom ends of the legs of the frame member 2. The boom 1, frame 2, and the strut frame 3 are preferably made of hollow steel tubing for maximum strength and also to enable the bottom end portions of the legs of the vertical frame 2 and those of the strut frame 3 to be cut away as at 6 to provide maximum load clearance between the opposing sides thereof.

The trailing end of the cart is supported upon wheels 7 and 8 rotatably mounted on their respective stub axle shafts 9 and 10 welded at their inner ends to wheel backing plates 11 which are secured to plates 12 covering the cutaway bottom end portions of the vertical and strut frames 2 and 3, respectively. The outer end of each axle shaft extends through aligned openings in the bottom ends of arms 13 and 14 whose opposite ends are secured as at 15 and 16, respectively, to the bottom end portions of the strut frame 3 and to those of the vertical frame 2. The outer end of each axle shaft is provided with a wheel retaining nut as shown which also secures the bottom ends of the arms 13 and 14 together.

The opposite end of the boom 1 is welded to a sleeve 17 pivotally mounted upon a horizontal shaft 18 provided at its outer end with a retaining nut 19. The inner end of the shaft 18 is cast integral with or welded to a U-shaped bracket 20 having a pin 21 extending transversely therethrough and through a ball 22 embraced by the bracket. Secured to the ball by welding or the like is a companion ball 23 pivotally attached to a vertical pin 24 extending through the outer end of a pair of horizontal arms 25 which constitute a drawbar attached to a towing vehicle such as a tractor or the like indicated generally at 26. The universal coupling just described allows the cart freedom of lateral and vertical movement in traveling over road or ground irregularities. To detach the cart from the towing vehicle it is merely necessary to remove the vertical pin 24.

Each wheel of the cart is provided with an hydraulically actuated brake including a pair of brake shoes 27 carried by each backing plate 11 and cooperating with a brake drum 28 carried by the wheel. The brake cylinder 29 of each wheel is connected to a fluid pressure line 30 extending through and thus protected by the hollow legs of the strut frame 3 and emerging therefrom through openings 30A to terminate in open communication with a T-fitting 31 mounted upon the boom 1. The T-fitting is connected by means of an elbow 32 and automatic hose coupling 33 to one end of a flexible fluid pressure supply line 34 whose opposite end is connected to a fluid pressure generator 35 attached as at 36 to the tractor and actuated by a hand lever 37 located within convenient reach of the operator for applying the brakes to lock the wheels 7 and 8 when desired.

Mounted centrally on top of the frame member 2 is a fair-lead 38 within which is rotatably mounted a sheave 39. A second sheave 40 is rotatably mounted by means of brackets 41 welded to the top of the boom forwardly of the sheave 39.

A cable 42, wound about and operated by the tractor-driven winch 43 extends along the boom 1, over the sheaves 40 and 39 and terminates in a hook 44 for attachment to a conventional sling or the like attached to one or more logs 45.

The operation of the invention is as follows:

By paying out cable, the tractor and cart go ahead of the load to firm or level ground. The wheel brakes are set to lock the wheels; then the logs are winched up to the approximate position shown in Figure 1. The brakes are then released and the tractor and loaded cart proceed. With only the trailing end of the load dragging ground friction is reduced to a minimum thus enabling the tractor to climb steep grades easier and to log in steep country and to finally deliver the logs to the mill in a clean condition.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A log cart comprising an upwardly and rearwardly curved boom rigidly secured at its elevated end to the top end of an inverted U-shaped transversely disposed vertical frame, a U-shaped strut frame rigidly secured at its bight portion to said boom intermediate the ends thereof and extending forwardly and downwardly therefrom, the bottom ends of the leg portions of said strut frame being reduced in thickness and rigidly secured to the bottom ends of the leg portions of said vertical frame also reduced in thickness, said boom, vertical frame and strut frame being made of hollow steel tubing, the opposite or forward end of the boom terminating in a universal coupling adapted for attachment to a draw-bar of a tractor, a pair of supporting wheels carried by stub axle shafts secured to and extending outwardly from said reduced and interconnected ends of both of said frames, a pair of arms removably secured to each of said interconnected ends of both frames and attached to the outer ends of said stub axle shafts to partake of the load applied thereto and to compensate for the reduction in thickness of said ends of both frames and to provide for maximum clearance between said supporting wheels, a cable extending from a tractor-driven winch along said boom through a fairlead carried by said vertical frame and terminating in a load engaging fitting, each of said supporting wheels having a fluid actuated brake, a fluid pressure line encased within each hollow leg of said strut frame and each adapted at its forward end for attachment to a wheel brake, each of said fluid pressure lines emerging from the opposite end of the strut frame at the bight portion thereof and connected to and in open communication with the interior of a fitting carried by said boom, a flexible fluid pressure supply line connected at one of its ends to and in open communication with said fitting and adapted at its opposite end for connection to a source of fluid pressure whereby said supply line will flex with travel motion of the cart and whereby each of said pressure supply lines within the hollow legs of said strut frame will be protected against damage by contact with extraneous objects encountered in logging operations.

References Cited in the file of this patent

UNITED STATES PATENTS

| | | |
|---|---|---|
| 1,910,181 | Reid | May 23, 1933 |
| 2,292,878 | Jarvis | Aug. 11, 1942 |
| 2,428,085 | Largen | Sept. 30, 1947 |
| 2,444,690 | Almendinger et al. | July 6, 1948 |
| 2,451,139 | Williams et al. | Oct. 12, 1948 |
| 2,518,322 | Hovey-King et al. | Aug. 8, 1950 |
| 2,612,279 | Simmons | Sept. 30, 1952 |